US009958136B2

(12) United States Patent
Santos et al.

(10) Patent No.: US 9,958,136 B2
(45) Date of Patent: May 1, 2018

(54) SENSOR DEVICE WITH INDICATOR AND RELATED METHODS

(71) Applicant: Rockwell Automation Technologies, Inc., Mayfield Heights, OH (US)

(72) Inventors: Roberto Santos, Hudson, MA (US); Jason Staly, Merrimack, NH (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 531 days.

(21) Appl. No.: 13/665,557

(22) Filed: Oct. 31, 2012

(65) Prior Publication Data

US 2013/0194778 A1   Aug. 1, 2013

Related U.S. Application Data

(63) Continuation-in-part of application No. 13/360,367, filed on Jan. 27, 2012, now Pat. No. 9,297,935.

(51) Int. Cl.
*F21V 9/16* (2006.01)
*F21V 8/00* (2006.01)

(52) U.S. Cl.
CPC .............. *F21V 9/16* (2013.01); *G02B 6/009* (2013.01); *G02B 6/0021* (2013.01); *G02B 6/0091* (2013.01)

(58) Field of Classification Search
CPC ........ F21K 9/56; F21K 9/135; F21V 23/0442; F21V 23/0457; F21V 9/16; G02B 6/0028; G02B 6/0076; G02B 6/006; G02B 6/0091; G02B 6/009; G02B 6/0021
USPC .............. 362/84, 235, 231, 293, 225, 311.01
See application file for complete search history.

(56) References Cited

U.S. PATENT DOCUMENTS

| | | | |
|---|---|---|---|
| 2,247,969 A | 7/1941 | Stewart | |
| 2,831,453 A | 4/1958 | Hardesty | |
| 3,241,256 A | 3/1966 | Viret et al. | |
| 4,984,142 A * | 1/1991 | Garnerone | 362/249.01 |
| 5,401,927 A | 3/1995 | Lundell et al. | |
| 5,947,578 A | 9/1999 | Ayres | |
| 6,168,282 B1 * | 1/2001 | Chien | 362/84 |
| 6,483,439 B1 | 11/2002 | Vukosic | |
| 6,655,986 B2 | 12/2003 | Kroll | |
| 6,714,711 B1 * | 3/2004 | Lieberman et al. | 385/124 |
| 6,784,603 B2 | 8/2004 | Pelka et al. | |
| 7,009,525 B1 | 3/2006 | Shafiyan-Rad et al. | |
| 7,097,322 B2 * | 8/2006 | Shuniak | 362/199 |

(Continued)

OTHER PUBLICATIONS

Evident Technologies Forms Nightmarker Business Unit; The basis for a wavelength converter to be used in sensors: 1 the ability to use much higher power IR sources and still be able to use silicon as a sensor; www.nightmarker.com/products/ir-paint; Oct. 7, 2008; 2 pages.

(Continued)

*Primary Examiner* — Bao Q Truong
*Assistant Examiner* — Arman B Fallahkhair
(74) *Attorney, Agent, or Firm* — Viksnins Harris Padys Malen LLP

(57) ABSTRACT

Devices and methods for providing sensor indication are disclosed. The sensor device includes utilizing the signal to activate a light source, transmitting light into a first indicator layer with the light source, and the first indicator layer optionally includes a fluorophore. The indicator layer provides visibility of light around the sensor device.

18 Claims, 14 Drawing Sheets

(56) References Cited

U.S. PATENT DOCUMENTS

| | | | |
|---|---|---|---|
| 7,218,824 B2* | 5/2007 | Franklin | G02B 6/0001 385/123 |
| 7,794,107 B2 | 9/2010 | Schoen et al. | |
| 7,810,985 B2 | 10/2010 | Chien | |
| D659,036 S | 5/2012 | Madsen et al. | |
| 8,421,037 B2 | 4/2013 | Leard | |
| 8,480,246 B2 | 7/2013 | Leard | |
| D688,960 S | 9/2013 | Santos et al. | |
| 8,727,597 B2* | 5/2014 | Meir et al. | 362/612 |
| 2004/0207997 A1 | 10/2004 | Stewart et al. | |
| 2006/0158886 A1 | 7/2006 | Lee | |
| 2006/0268537 A1 | 11/2006 | Kurihara et al. | |
| 2007/0230175 A1 | 10/2007 | Montgomery | |
| 2009/0001397 A1* | 1/2009 | Fine | G02B 6/0018 257/98 |
| 2009/0159691 A1 | 6/2009 | Halbur et al. | |
| 2009/0161369 A1 | 6/2009 | Regev et al. | |
| 2010/0136302 A1 | 6/2010 | Comanzo et al. | |
| 2011/0042700 A1 | 2/2011 | Lenk | |
| 2011/0198026 A1 | 8/2011 | Gourlay | |
| 2011/0227487 A1 | 9/2011 | Nichol et al. | |
| 2012/0236595 A1* | 9/2012 | Parker et al. | 362/609 |
| 2013/0194776 A1 | 8/2013 | Santos et al. | |

OTHER PUBLICATIONS

LED Backlighting/Nanosys; www.nanosysinc.com/what_we_do led_backlighting; printed Jun. 14, 2011; 1 page.

European Patent Office, Extended European Search Report for EP Application No. 13191220.6, 9 pages, dated Aug. 28, 2017.

* cited by examiner

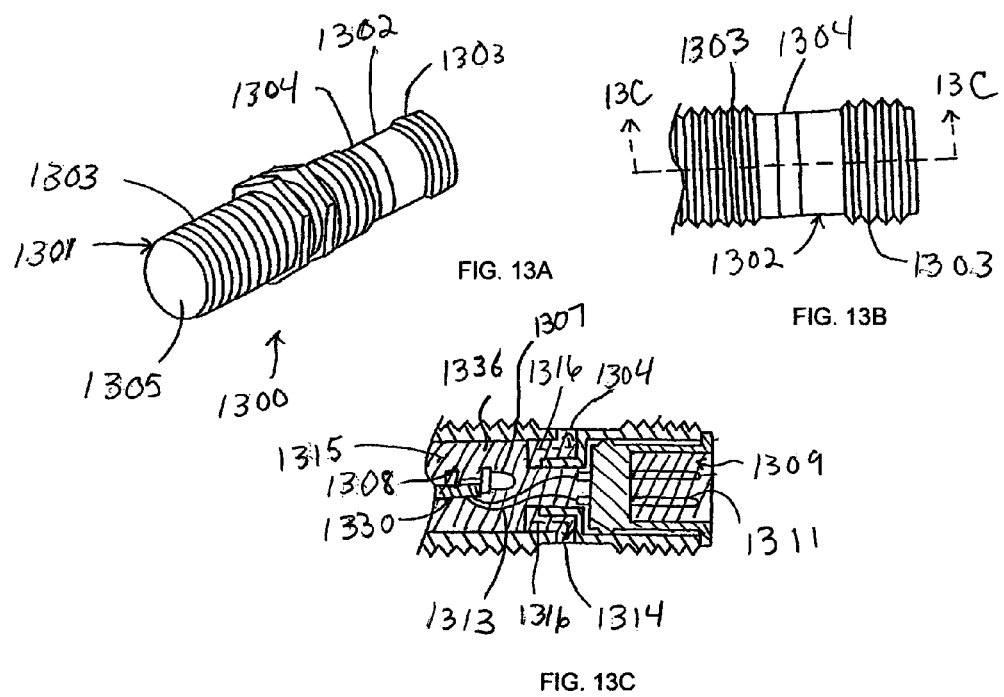
FIG. 13A
FIG. 13B
FIG. 13C
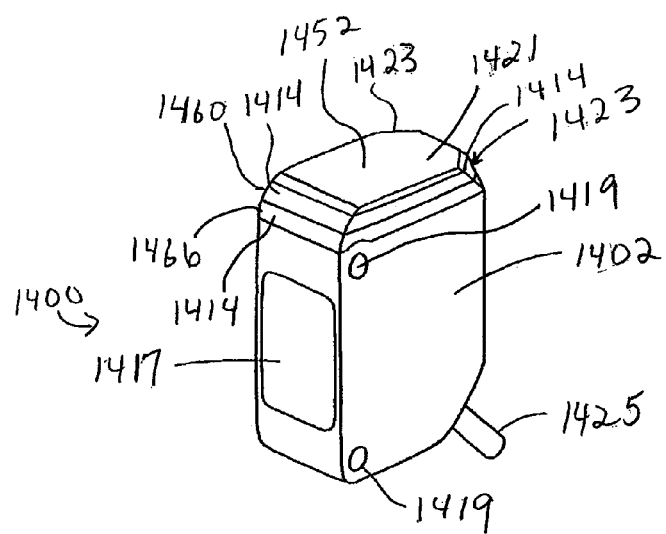
FIG. 14

SENSOR DEVICE WITH INDICATOR AND RELATED METHODS

CROSS-REFERENCE TO RELATED APPLICATIONS

This application is related to application entitled "METHOD AND DEVICE FOR ENHANCING SENSOR INDICATION" having Ser. No. 13/360,367, filed Jan. 27, 2012, which is incorporated herein by reference in its entirety.

TECHNICAL FIELD

The present invention relates to the field of sensors and, more particularly, to methods and devices for enhancing the visibility of sensor indicators.

TECHNICAL BACKGROUND

Industrial sensors are commonly used in a wide variety of applications and environments. Industrial sensors, such as proximity, optical and photoelectric sensors, can be used to detect the presence or absence of targets on a conveyor belt. In addition, industrial sensors can be used to monitor various components of process machinery. Industrial sensors often use one or more light sources that serve as indicators to convey a status signal, such as power, output, or margin, to an end user during set-up and operation. Light from the light source is often conveyed through a light pipe or similar optical structure serving to guide the light to the external environment. The light source is often colored or projected through a colored lens to emit colored light, often green, yellow, orange, or red. The visibility of these light-guide-coupled light sources is often poor, particularly when viewed from a large off-center angle, such as when the sensor is mounted above a viewing angle of the end-user. With the light source typically mounted on a PCB inside the sensor enclosure, much of the light source's light intensity is either reflected, scattered, or absorbed before it makes its way to the external environment to be viewed. The result is that the sensor's indicator lights appear relatively dim and so for proper viewing an end-user may desire to move close to the sensor to view the indicators. Additionally, achieving a uniform illumination that is visible from all around the perimeter of the sensor is also problematic.

Furthermore, some industrial sensors, such as proximity sensors, often have a light source that is encapsulated in an epoxy potting material within the sensor housing. The light that is visible from the light source embedded in the potting is often faint as the majority of the light that is produced by the light source is either scattered or absorbed by the potting, preventing that light from escaping to the external environment where it can be viewed.

Various solutions have been tried to address poor sensor indicator visibility, such as selecting brighter (and possibly larger) light source components, increasing the electrical current supplied to the light source, and using physical optical structures such as prisms, light pipes, textured surfaces, polished surfaces, and facets. Although the aforementioned methods can increase indicator visibility, they include various drawbacks, such as more expensive parts, additional part processing, increased electric load on a base circuit, and increased housing size to accommodate larger parts or additional structures.

Therefore, it would be advantageous if an improved device or method for enhancing the visibility of sensor indicators could be developed that would allow one or more of the drawbacks discussed above and/or one or more other drawbacks to be entirely or at least partly overcome.

SUMMARY

In at least some embodiments, a sensing device with enhanced sensor indication includes, a first indicator layer including a substrate having a top surface, a bottom surface, and end walls situated at least partially between the perimeters of the top surface and the bottom surface, wherein the first indicator layer is at least one of transparent and translucent, one or more fluorophores embedded in the indicator layer, a first light source for transmitting light into the indicator layer, wherein the transmitted light is reflected inside the indicator layer and absorbed by the fluorophore to generate enhanced light that is emitted from the end walls, wherein the enhanced light includes the light transmitted from the first light source with at least one characteristic modified by the fluorophore, a sensing circuit, and a housing for at least partially enclosing the first light source, the sensing circuit, and the first indicator layer.

In at least some other embodiments, a sensing device with enhanced sensor indication includes, a first indicator layer including a substrate having a first top surface, a first bottom surface, and first end walls situated at least partially between the perimeters of the first top surface and the first bottom surface, wherein the first indicator layer is at least one of transparent and translucent, a second indicator layer including a substrate having a second top surface, a second bottom surface, and second end walls situated at least partially between the perimeters of the second top surface and the second bottom surface, wherein the second indicator layer is at least one of transparent and translucent. The sensing device further includes, a center barrier positioned between the first indicator layer and the second indicator layer, wherein the center barrier at least partially limits the passage of light between the first and second indicator layers, one or more fluorophores embedded in the first and second indicator layers, a first light source for transmitting light into the first indicator layer wherein the light is transmitted inside the first indicator layer and absorbed by the fluorophore to generate first enhanced light that is emitted from the first end walls, wherein the first enhanced light includes the light transmitted from the first light source with at least one characteristic modified by the fluorophore. The sensing device still further includes, a second light source for transmitting light into the second indicator layer wherein the light is transmitted inside the second indicator layer and absorbed by the fluorophore to generate second enhanced light that is emitted from the second end walls, wherein the second enhanced light includes the light transmitted from the second light source with at least one characteristic modified by the fluorophore, a passage extending through at least the first indicator layer, a sensing circuit, and a housing for at least partially enclosing the first and second light sources, the sensing circuit, and the first and second indicator layers.

In at least yet some other embodiments, a method of providing a sensor indication includes, sensing an operational status at a sensor circuit, generating a signal at the sensor circuit based on the sensed operational status, utilizing the signal to activate a light source, transmitting light into a first indicator layer with the light source, wherein the first indicator layer includes a fluorophore embedded within a substrate, and wherein the fluorophore modifies at least one characteristic of the transmitted light from the light source, and emitting the modified transmitted light from an end wall of the first indicator layer.

In one or more embodiments, a sensing device includes at least one indicator layer including a first indicator layer having a top surface, a bottom surface, and one or more end walls at least partially between the perimeters of the top surface and the bottom surface, and the end wall circumnavigates the housing such that the indicator layer is viewable 360 degrees around the housing. A first light source disposed near the indicator layer, and a housing is at least partially enclosing the first light source, and the first indicator layer. In one or more embodiments, the at least one indicator layer extends along an edge of at least one of a top, bottom, side surface of the housing and transitions away from the edge and toward an intermediate portion of the outer housing.

In one or more embodiments, a sensing device includes a housing having an outer perimeter, a first indicator layer including a substrate having a first top surface, a first bottom surface, and first end wall is at least partially between the perimeters of the first top surface and the first bottom surface. The first indicator layer is at least partially disposed within the housing, the first end wall substantially disposed around the housing outer perimeter. The sensing device further includes a second indicator layer including a substrate having a second top surface, a second bottom surface, and one or more second end walls is at least partially between the perimeters of the second top surface and the second bottom surface. A center barrier is positioned between the first indicator layer and the second indicator layer, wherein the center barrier at least partially limits the passage of light between the first and second indicator layers, and a light source is disposed near the first indicator layer and the second indicator layer.

In one or more embodiments, a method of providing indication for a sensing device includes sensing an operational status at a sensor circuit, generating a signal at the sensor circuit based on the sensed operational status, utilizing the signal to activate a light source, transmitting light into a first indicator layer with the light source, emitting light from an end wall of the first indicator layer, the end wall disposed along a perimeter of the sensing device, and is viewable around a perimeter of the sensing device.

Other embodiments, aspects, features, objectives, and advantages of the present invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangements of components illustrated in the drawings. The invention is capable of other embodiments or of being practiced or carried out in various other ways. Like reference numerals are used to indicate like components. In the drawings:

FIG. 13A is a perspective view of another embodiment of a sensor, configured as a proximity sensor;

FIG. 13B is a partial top view of the sensor of FIG. 13A;

FIG. 13C is a cross-sectional view of the sensor of FIG. 13B, taken along line 13C-13C thereof;

FIG. 14 is a perspective view of another embodiment of a sensor, configured as a photoelectric sensor;

DETAILED DESCRIPTION

Figure 1:
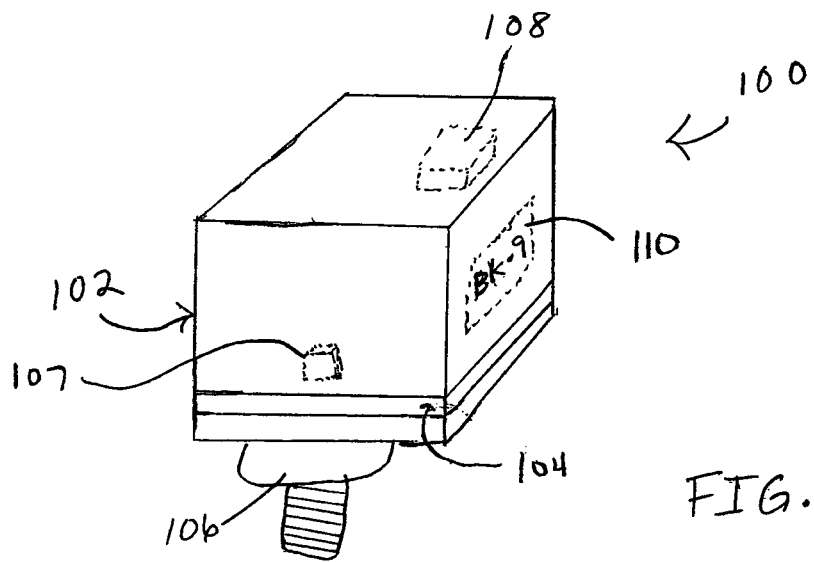
FIG. 1 is a perspective view of an exemplary sensor with an indicating capability.

FIG. 1 depicts an exemplary sensor 100 having an indicating ability. The sensor 100 includes a housing 102, an indicator layer 104, and a mounting portion 106. The housing 102 is configured to at least partially enclose the indicator layer 104 and a light source 107. The light source 107 provides light to illuminate the indicator layer 104 to provide an indication based on the sensing of an event at the sensor 100. The sensor 100 can include one of various types of sensing circuits 108 for providing an output to energize the light source 107 when desired conditions are met. Such sensing circuits 108 are commonly found, for example, in proximity sensors and photosensors.

Figure 2:
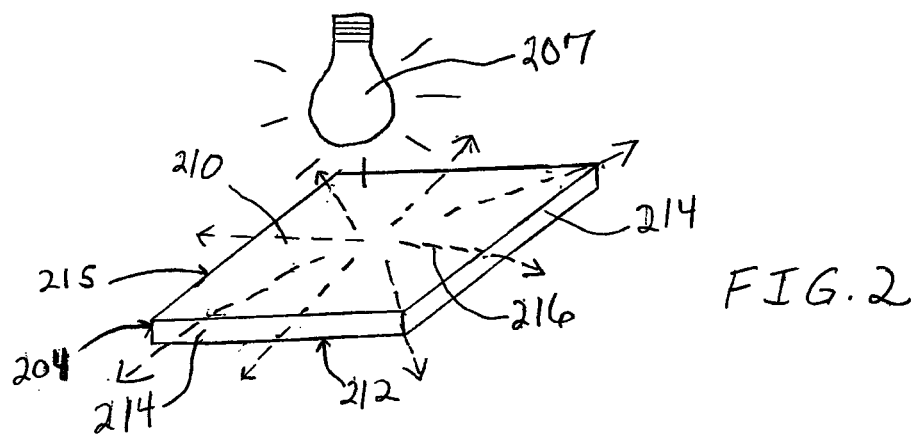
FIG. 2 is a perspective view of one exemplary embodiment of an indicator layer and a light source.

Referring to FIG. 2, one exemplary embodiment of the indicator layer 204 and the light source 207 are shown. The light source 207 serves to provide illumination to the indicator layer 204 and can include one or more of various source of light, for example, an incandescent light bulb, an LED, and an OLED. The indicator layer 204 includes a substrate having a top surface 210, a bottom surface 212, and a plurality of end walls 214 forming a layer perimeter 215. The indicator layer 204 includes, in at least some embodiments, a substrate with embedded and/or enclosed fluorophores, as discussed further below. The fluorophore may consist of a fluorescent dye, nano-phosphor, or quantum dot. As seen in FIG. 2, the light source 207 can be positioned to direct light through the top surface 210 of the indicator layer 204. Light received into the top surface 210 of the indicator layer 204 is reflected and affected by the fluorophore to establish enhanced light 216. More particularly, the fluorophore absorbs the light received from the light source 207 and, upon absorption, the wavelength of the light is both shifted along the electromagnetic spectrum from a higher energy, shorter wavelength to a lower energy, longer wavelength and scattered in many directions to increase the visibility of the light to the human eye from various observation directions. Furthermore, the overall size of the surfaces 210, 212 is greater than the height of the end walls 214 such that the enhanced light 216 produces an intensified image along the perimeter 215 of the end walls 214 as it is emitted from the indicator layer 204.

As the top surface 210 and/or bottom surface 212 of the indicator layer 204 can be at least partially enclosed by a housing, such as housing 102, to maximize visibility the enhanced light 216 is directed to the typically exposed end walls 214 forming the layer perimeter 215. Depending on the surface configuration used for the indicator layer 204, the amount of enhanced light 216 (after being established within the indicator layer) that passes through the top surface 210 and the bottom surface 212, and therefore does not reach the end walls 214 (i.e., light losses), can be minimized. For example, when the indicator layer 204 is configured in a sheet or sheet-like form where the top and bottom surfaces 210, 212 are highly polished, such as to an SPI-A3 or better finish, so as to produce internal reflections, the enhanced light 216 is predominantly reflected internally towards the end walls 214 of the indicator layer 204. In addition, as the enhanced light 216 is internally reflected within (e.g., internally reflected off the top and bottom surfaces 210, 212) the indicator layer 204 and communicated to the end walls 214, it becomes more concentrated and thereby produces a bright glowing effect along the end walls 214 as the enhanced light 216 is emitted from the indicator layer 204. This glowing effect is known as an "edge-glow" effect.

The end walls 214 are shown orthogonal to the plane of the top surface 210 and bottom surface 212, which are parallel to one another, to maximize illumination from the end walls 214, although the end walls 214 can be positioned at various other angles relative to the top surface 210 and/or bottom surface 212 (which need not always be parallel to one another), as discussed below. To maximize the "edge-glow" effect, the indicator layer 204 can be comprised of a transparent material to maximize internal reflections. In at least some embodiments, the indicator layer 204 can include a transparent, semi-transparent, and/or translucent material, such as acrylic (PMMA), polycarbonate (PC), styrene-acrylonitrile (SAN), or polystyrene (PS), although other materials with varying transparency levels can be used as well, such as glass. In other embodiments where nano-phosphors or quantum dots are used, the indicator layer 204 can include these compounds in its bulk, embodied in an attached or applied layer at least partially covering the outer surface around the indicator layer 204. The nano-phosphors and quantum dots are fluorophores that absorb energy emitted by the light source 207 and re-emit that energy at random angles and at specified wavelengths defined by the fluorophore's size. One benefit of using nano-phosphors or quantum dots is their inherent efficacy in wavelength conversion between the emission of the light source 207 and the desired output color. Another benefit is that a sensor can be standardized in form and function and then specialized by the addition of the nano-phosphor or quantum dot layers and surfaces. Yet another benefit is that the nano-phosphor or quantum dots can be spatially constructed to impart information about a sensor such as a logo, part number, and operational-state data, without having to add these features into the molded part. In this regard, the indicator layer 204 and/or a display layer 110 (see FIG. 1) can be utilized in one or more embodiments to display the sensor information, wherein the display layer 110 would be visible through a sensor housing, such as housing 102, and sized to accommodate the information as necessary and/or desired.

Further, to increase the uniformity of illumination along the end walls 214, a diffuse light source can be employed as the light source 207. Also, applying a texture, such as a Charmilles #30 or Mold-Tech® MT-11520, to the end walls 214 can assist with producing a generally uniform and diffuse "edge-glow" effect. The fluorophore can be of any conventional, commercially-available fluorescent dye, nano-phosphor, or quantum dot that is suitable for absorbing and enhancing light and capable of being embedded in the indicator layer 204.

Figure 3:
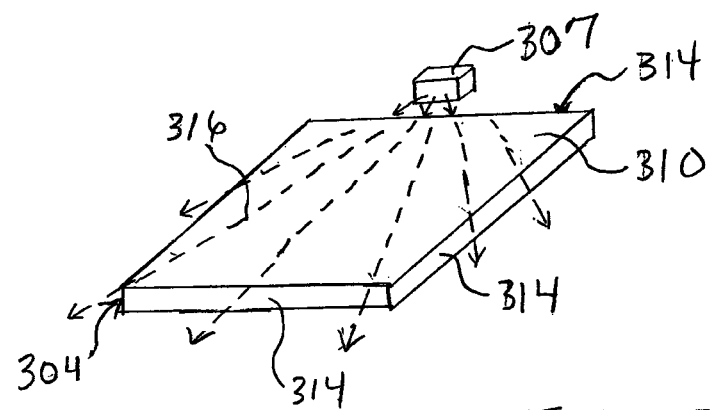
FIG. 3 is a perspective view of another exemplary embodiment of an indicator layer and a light source.

Referring to FIG. 3, an LED-based light source 307 is depicted emitting light into an indicator layer 304 through an end wall 314, as opposed to through a top surface 310, as discussed above. The use of an LED-based light source provides a powerful, yet efficient light source. In addition, an LED-based light source can allow for various options for coloring the light prior to entering the indicator layer 304, and therefore changing the color of resultant enhanced light 316. However, the use of fluorophores in the indicator layer 304 allows for a variety of color choices for the enhanced light 316 without requiring a light source 307 that emits a specific color. For example, a white, blue, or UV LED can be used as the light source 307 with an appropriate fluorophore to produce a desired color. By utilizing different fluorophores in an indicator layer 304 or multiple indicator layers 304, a pair of LEDs having the same color can be used as light sources 307 to generate different color indications that are illuminated from the end walls 314. In this manner, various types of sensors 300 can be mass-produced using a single color LED to supply all the light sources 307, thus avoiding the need to stock and install various different light source parts. Furthermore, in some cases, if a longer wavelength, lower energy LED, such as an orange LED, were used to illuminate an indicator layer 304 consisting of a fluorophore that is excited by longer wavelength, higher energy light than is emitted by the orange LED, such as a yellow fluorophore for example, the result would be that the orange LED would not excite the yellow fluorophore and the indicator layer would appear to be a hue of orange. By combining this approach with the use of two LED's, one that excites the yellow fluorophore, such as a blue LED, and one that does not, such as an orange LED, it is possible to obtain the emission of two distinct colors from a single indicator layer 304 provided that the LED's are turned on individually and not at the same time.

Figure 4A:
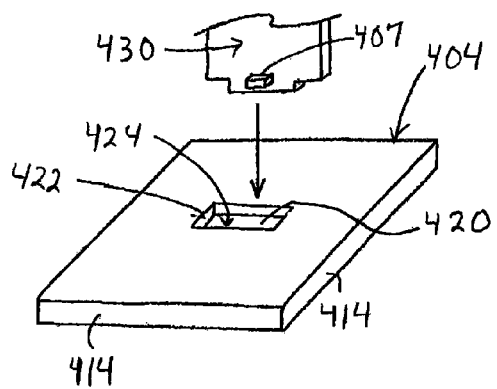
FIG. 4A is a perspective view of an exemplary printed circuit board with a light source and another exemplary embodiment of an indicator layer.
Figure 4B:
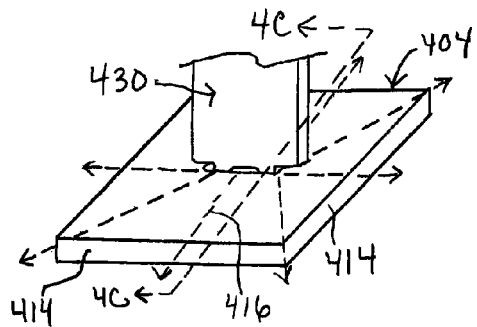
FIG. 4B is a perspective view of the printed circuit board and an indicator layer of FIG. 4A, subsequent to installation of the former into the latter.
Figure 4C:
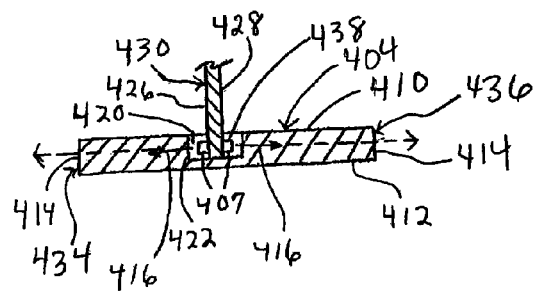
FIG. 4C illustrates a cross-section of the printed circuit board and indicator layer of FIG. 4B taken along line 4C-4C thereof.

Referring now to FIGS. 4A-4C, another embodiment of the indicator layer 404 is depicted. The indicator layer 404 includes a recess 420 forming a plurality of inner walls 422 about a center portion 424. Although the recess 420 is depicted as extending through the top surface 410 and not through the bottom surface 412, in at least some embodiments, the recess 420 can be an orifice that extends through the bottom surface 412 as well. Light sources 407 are provided on each of a first side 426 and second side 428 of a printed circuit board (PCB) 430. The light sources 407 are in at least some embodiments surface mounted LED's and are positioned on the PCB 430 to fit at least partially inside the recess 420 formed in the indicator layer 404. The PCB 430 includes a light source driver circuit (not shown) configured to illuminate one or both of the light sources 407.

As seen in FIGS. 4B and 4C, with the PCB 430 installed in the recess 420 the light sources 407 are positioned to transmit a substantial portion of their light directly into the indicator layer 404. As discussed above, light emitted from the light sources 407 is passed through the inner walls 422 and absorbed by the fluorophore in the indicator layer 404 to generate enhanced light 416 that is transmitted through the indicator layer 404 and emitted out of the end walls 414 of the indicator layer 404. In addition, with the light sources 407 positioned in the center portion 424 and on the first and second sides 426, 428 of the PCB 430, enhanced light 416 can be effectively emitted from each of the end walls 414 that surround the indicator layer 404 to provide light that is visible from all sides. Alternatively, only one light source 407 can be used to provide illumination along a first side 434 of the indicator layer 404.

In at least some embodiments, the recess 420 can be at least partially filled with a transparent or translucent potting material 438, such as epoxy, to help couple the light from the light sources 407 into the inner walls 422 of the indicator layer 404. The use of potting material 438 can reduce light losses and/or reduce or eliminate visible "hot-spots" created by the intensity of the light sources 407.

Figure 5:
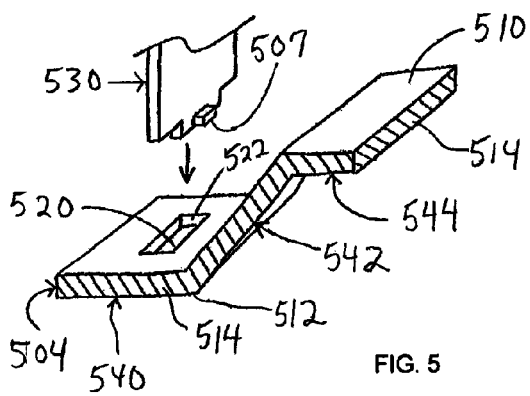
FIG. 5 is a perspective view of yet another exemplary embodiment of a printed circuit board and indicator layer.

Referring to FIG. 5, yet another embodiment of the indicator layer 504 is depicted. It should be appreciated that, depending upon the embodiment, the indicator layer 504 can be configured to include various shapes and sizes to provide an indicator layer 504 that is shaped and sized to accommodate various types of sensors. For example, as seen in FIG. 5, the indicator layer 504 in one embodiment is configured to include a first portion 540 connected to a second portion 542 that ramps up to a third portion 544. The PCB 530 includes a single LED light source 507, although other types and quantities of light sources 507 can be provided in this embodiment, as well as other embodiments discussed herein.

Once the PCB 530 is inserted into the recess 520 of the indicator layer 504 and the light source 507 is energized, light is passed into the indicator layer 504 through the inner walls 522 and reflected inside the indicator layer 504 as enhanced light 516. The enhanced light 516 is reflected inside the indicator layer 504 so as to proceed through each portion 540, 542, 544 and so as to be emitted from each of the end walls 514, although not equally, to provide a sensor indicator with illumination substantially along all of the end walls 514 to provide visibility around the perimeter of the sensor. Visibility could be enhanced by providing an additional light source 507 on the opposite side of the PCB 530.

Figure 6A:
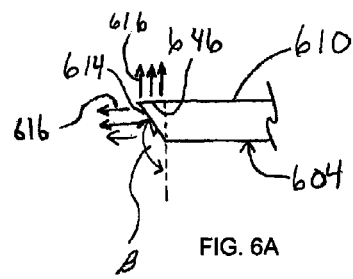
FIG. 6A is a side view of a portion of an exemplary indicator layer.
Figure 6B:
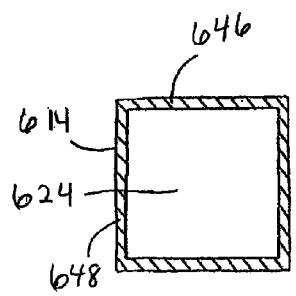
FIG. 6B is a top view of an indicator layer that includes the portion of FIG. 6A.

Referring now to FIG. 6A, a portion of an indicator layer 604 (such as shown in FIG. 2) is shown with an end wall 614 at an angle β that is not orthogonal to a top surface 610 of the indicator layer 604. As noted above, maximum light is emitted from the end walls 614 when they are orthogonal to the top surface 610. By positioning the end wall 614 at a non-orthogonal angle, enhanced light 616 is emitted from both the end wall 614 and an end portion 646 of the top surface 610. More particularly, because of the angle of the end wall 614, at least a portion of the enhanced light 616 that contacts the end wall 614 is reflected upwards to the end portion 646 to provide a partial illumination of the top surface 610. Referring to FIG. 6B, with each of the end walls 614 having an angle β that is at about 135 degrees, a top surface perimeter 648 that includes the end portions 646 is illuminated, while an interior portion of the top surface 610 bounded by the top surface perimeter includes minimal or no illumination. Although the indicator layer 604 is shown in FIG. 6B as a square with equal angles β for each end wall 614, in at least some embodiments, other indicator layer shapes and angles β can be provided (e.g., such that the top surface perimeter need not have a uniform width).

Figure 7A:
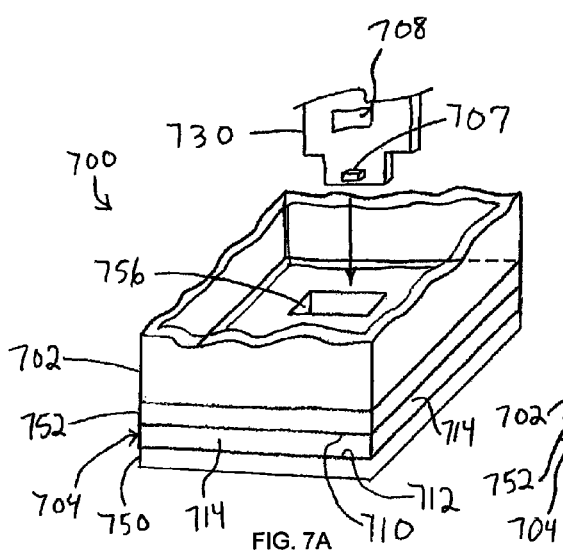
FIG. 7A is a partially cut-away perspective view of an exemplary sensor.
Figure 7B:
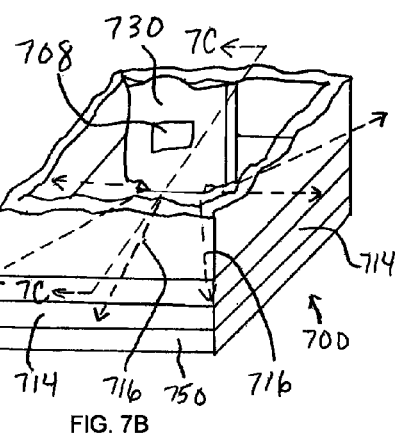
FIG. 7B is a partially cut-away perspective view of the sensor of FIG. 7A, with a printed circuit board installed in an indicator layer.
Figure 7C:
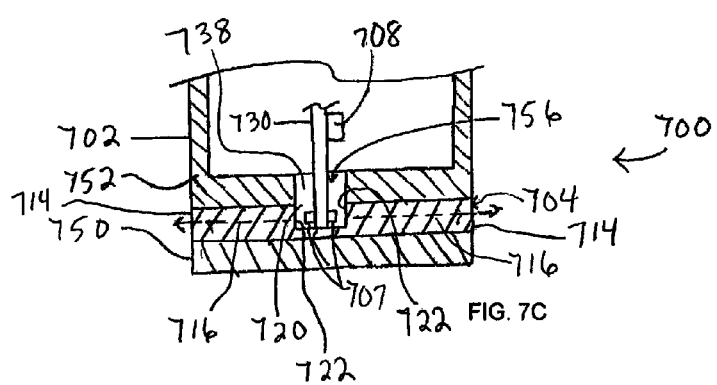
FIG. 7C illustrates a cross-section of the sensor of FIG. 7B, taken along line 7C-7C thereof.

Referring to FIGS. 7A-7C, a partial view of another exemplary sensor 700 is shown with an indicator layer 704 secured to a housing 702. FIG. 7B illustrates the PCB 730 and indicator layer 704 subsequent to installation of the former into the latter. As shown, the sensor 700 includes a bottom surface barrier 750 that is positioned at least partially under a bottom surface 712 of the indicator layer 704. The bottom surface barrier 750 can include one or more of various materials configured to limit or prevent the loss of enhanced light 716 through the bottom surface 712, thereby increasing the light intensity emitted from a plurality of end walls 714 of the indicator layer 704. In at least some embodiments, the bottom surface barrier 750 can include an opaque, reflective substrate, while in other embodiments, the bottom surface barrier 750 can include a reflective coating applied to the bottom surface 712. Similarly, in the present embodiment, a top surface 710 of the indicator layer 704 also includes a top surface bather 752 to limit or prevent the loss of enhanced light 716 through the top surface 710. In at least one embodiment, the housing 702 of the sensor 700 extends at least partially across the top surface 710 to serve as the top surface bather 752, although in other embodiments, the top surface bather 752 can be provided as a separate element from the housing 702, similar to the bottom surface barrier 750. Further, in at least some embodiments, the top surface bather 752 can include a reflective coating applied to the top surface 710. Although both a top surface bather 752 and a bottom surface bather 750 are shown, in at least some embodiments only one or the other is provided.

As shown in FIG. 7C (a cross-section of FIG. 7B), the light sources 707 mounted on the PCB 730 are positioned inside the recess 720 to transmit light into the inner walls 722. When the light sources 707 are energized and light is transmitted through the inner walls 722, the resultant enhanced light 716 is reflected within the indicator layer 704 towards the end walls 714. Loss of the enhanced light 716 through the top surface 710 and the bottom surface 712 is limited by the bottom surface bather 750 and top surface bather 752, which reflect the enhanced light back into the indicator layer 704. Further as seen in FIG. 7C, the housing 702 also includes a hole 756 for allowing the PCB 730 to pass therethrough. The recess 720, as well as the hole 756, can be filled with a transparent or translucent material, such as epoxy potting 738, to help couple the light from the light sources 707 through the inner walls 722 and into the indicator layer 704.

Figure 8:
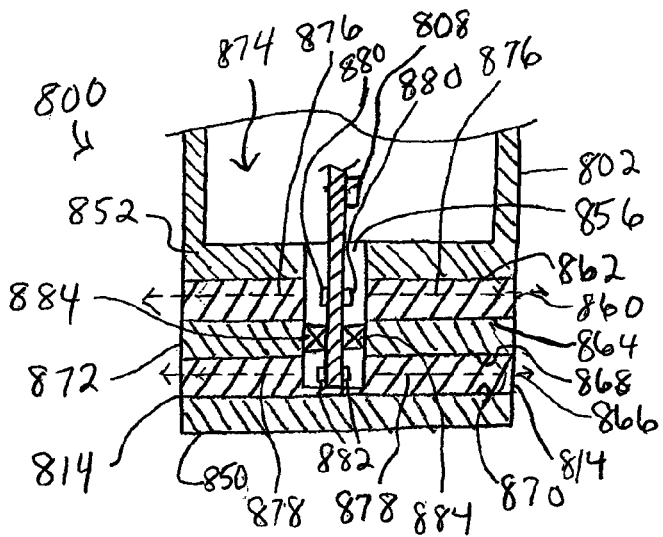
FIG. 8 is a partially cut-away perspective view of a cross-section of another exemplary embodiment of the sensor.

Referring to FIG. 8, a partial view of another embodiment of the sensor 800 is shown in cross-section. The sensor 800 includes two indicator layers 804, namely, a first indicator layer 860 having a first top surface 862 and a first bottom surface 864, and a second indicator layer 866 having a second top surface 868 and a second bottom surface 870. The first top surface 862 is secured to a housing 802, which in this embodiment provides a top surface barrier 852. A bottom surface barrier 850 is adhered to the second bottom surface 870. In addition, a center barrier 872 is provided between the first bottom surface 864 of the first indicator layer 860 and the second top surface 868 of the second indicator layer 866. The center barrier 872 is provided to limit or prevent first enhanced light 876 that is passed through the first indicator layer 860 from entering the second indicator layer 866. Similarly, the center barrier 872 limits or prevents second enhanced light 878 that is passed through the second indicator layer 866 from entering the first indicator layer 860. In this manner, the illumination of indicator layers 860, 866 can be independent of each other. The center barrier 872 can include a substrate comprised of an opaque metallized plastic, a metallic foil, reflective in-mold-label, or other suitable material that serves to limit or prevent the transmission of light therethrough. In addition to or in place of a substrate, the center barrier 872 can be comprised of a reflective coating that is applied to one or both of the first bottom surface 864 and the second top surface 868.

Light sources 807, namely, upper light sources 880 and lower light sources 882 are positioned on a PCB 830 to direct light from the upper light sources 880 into the first indicator layer 860 and light from the lower light sources 882 into the second indicator layer 866. One or more light source barriers 884 can be provided between the upper light sources 880 and the lower light sources 882 to prevent the passage of light therebetween. The light source barriers 884 in the present embodiment extend between the PCB 830 and the center barrier 872, and can include foam or another suitable material to limit or prevent the transmission of light.

Utilizing the configuration shown in FIG. 8, a single sensor 800 can provide multiple indications to an observer. For example, each indicator layer 860, 866 can be illuminated independently by energizing the upper light sources 880 and the lower light sources 882, respectively, based on different criteria. In addition, the first indicator layer 860 can incorporate a fluorophore that is different in color from the fluorophore that is incorporated into the second indicator layer 866, thereby providing additional discriminating indications, such as a green light source to indicate a machine is "on" and a red light source to indicate the machine is "off." In addition, the light sources 880, 882 can be of a single color, while the color of the fluorophores in the indicator layers 860, 866 can be varied. In addition, in at least some embodiments, more than one light source 807 can be provided on each side of the PCB 830 for each indicator layer 804.

Further, although only one center barrier 872 is shown with two indicator layers 804 and four light sources 807, multiple center barriers 872 and/or multiple light sources 807 can be provided and positioned between two or more indicator layers 804 to provide a greater quantity of indications for view by an observer. This holds true for various other embodiments described herein.

Figure 9:
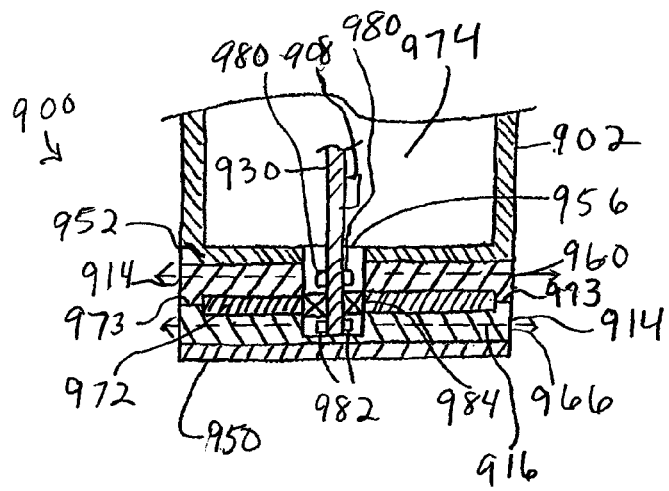
FIG. 9 is a partial view of yet another embodiment of a sensor, shown in cross-section.

Referring to FIG. 9, a partial view of yet another embodiment of the sensor 900 shown in cross-section is provided. The sensor 900 in FIG. 9 is similar to the sensor 800 shown in FIG. 8, with the exception that the center barrier 972 does not extend to the end walls 914 of each of the first and second indicator layers 960, 966. This allows the center barrier 972 to be completely encapsulated by the first and second indicator layers 960, 966 at the end walls 914. Such a configuration is particularly advantageous in industrial settings, when the material composition of the center barrier 972 is less chemically resistant than the material composition of the first and second indicator layers 960, 966. Furthermore, sealing the center barrier 972 and both of the first and second indicator layers 960, 962 adjacent the end walls 914 can be less efficient and less durable than forming a hermetic joint 973 by joining the materials that make up the first and second indicator layers 960, 966 (which can be similar or identical). A hermetic joint can be achieved between the first and second indicator layers 960, 966 using any of a variety of methods, such as overmolding, two-shot molding, solvent bonding, adhesive bonding, laser welding, and ultrasonic welding.

Joining the first and second indicator layers 960, 966 at the end walls 914 can allow for some crosstalk of light therebetween, although minimizing the distances between the outer ends of center barrier 972 and the end walls 914 can maintain an acceptable level of light intrusion.

Figure 10:
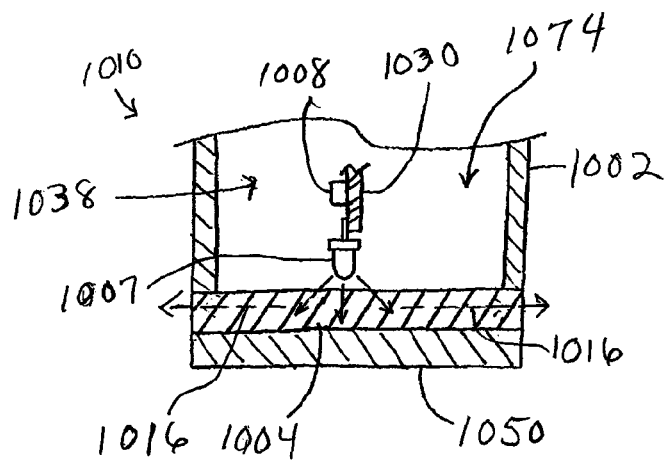
FIG. 10 is a partial view of still another embodiment of a sensor, shown in cross-section.

Referring to FIG. 10, a partial view of still another embodiment of the sensor 1000 is shown. In this embodiment, an indicator layer 1004 is positioned at least partially between a housing 1002 and a bottom surface barrier 1050. A PCB 1030 with a light source 1007 mounted thereon is provided. The light source 1007 is positioned in a housing interior cavity 1074 as opposed to a recess, as discussed above. When the light source 1007 is energized, light from the light source 1007 enters the indicator layer 1004 and enhanced light 1016 is generated that reflects to the end walls 1014 to produce an "edge-glow" effect. The housing interior cavity 1074 can be filled partially or in its entirety with a transparent/translucent material such as an epoxy potting 1038 as is common practice for many types of sensors.

Figure 11:
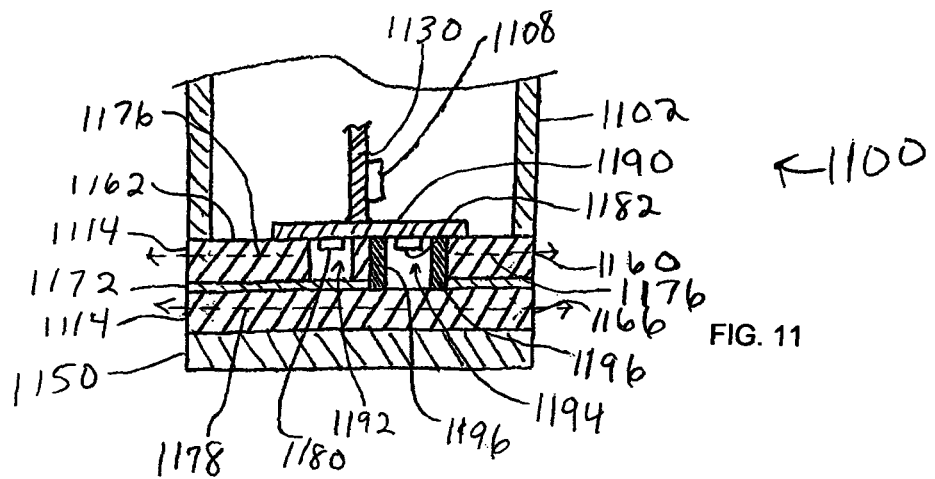
FIG. 11 is a partial view of still yet another embodiment of a sensor, shown in cross-section.

Referring to FIG. 11, a partial view of still yet another embodiment of the sensor 1100 is shown. In this embodiment, first and second indicator layers 1160, 1166 are situated between a housing 1102 and a bottom surface barrier 1150. The indicator layers 1160, 1166 are separated by a center barrier 1172. A pair of light sources 1107, namely a first light source 1180 and a second light source 1182, are mounted on a cover portion 1190 that is part of or connected to a PCB 1130. The cover portion 1190 is positioned in the housing 1102 such that it rests against the first top surface 1162.

The first light source 1180 is positioned by the PCB 1130 to provide illumination to a first cavity 1192 formed at least in part by the first indicator layer 1160, the center barrier 1172, and the cover portion 1190. The configuration of the first cavity 1192 allows for light from the first light source 1180 to illuminate the first indicator layer 1160 (generating first enhanced light 1176) without illuminating the second indicator layer 1166. A second cavity 1194 is formed at least in part by the second indicator layer 1166, the cover portion 1190, and one or more wall barriers 1196 extending therebetween. The wall barriers 1196 can include an opaque material, such as plastic, metal, or foam.

As seen in FIG. 11, the first indicator layer 1160 and the center barrier 1172 do not extend into the second cavity 1194 and they are at least partially blocked from receiving light from the second light source 1182 by the wall barriers 1196. This configuration allows light from the light source 1182 to illuminate the second indicator layer 1166 (generating second enhanced light 1178) while limiting or preventing this light from illuminating the first indicator layer 1160.

Figure 12A:
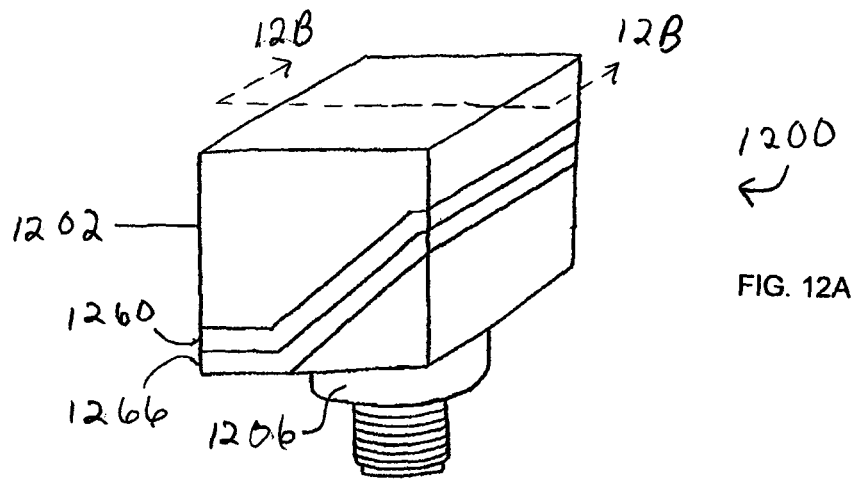
FIG. 12A is a perspective view of a further embodiment of a sensor.
Figure 12B:
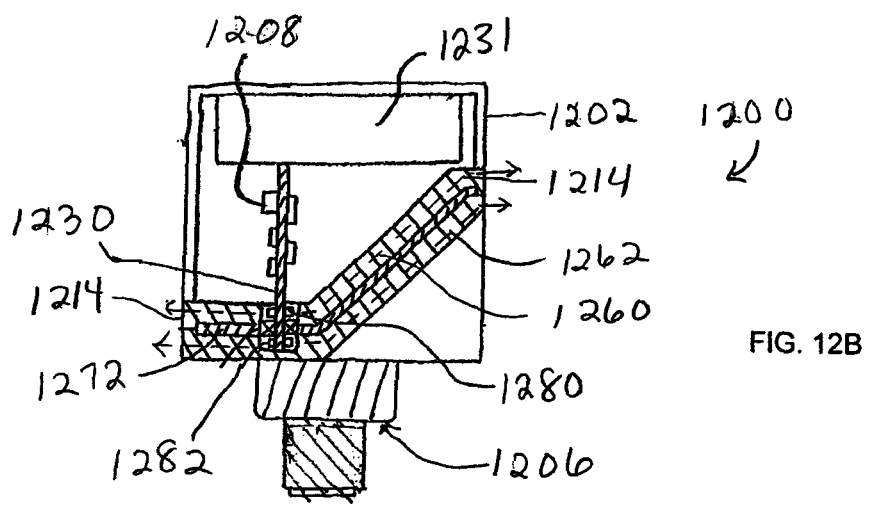
FIG. 12B is a cross-sectional view of the sensor of FIG. 12A, taken along line 12B-12B thereof.

Referring now to FIGS. 12A and 12B, a further embodiment of the sensor 1200 is shown, wherein the sensor 1200 is an inductive proximity sensor. The sensor 1200 includes a housing 1202, a first and second indicator layer 1260, 1266, and a mounting portion 1206. Similar to the indicator layer 504 in FIG. 5, the first and second indicator layers 1260, 1266 include multi-planar portions. Also similar to the embodiment of FIG. 9, the first and second indicator layers 1260, 1266 are partially separated by the center barrier 1272 and include multiple first and second light sources 1280, 1282 positioned on a PCB 1230 to allow for substantially independent illumination of the layers 1260, 1266. As discussed above, this configuration provides a sensor that is capable of multiple indications that are visible to an observer from multiple viewing positions. In addition, the end walls 1214 of the first and second indicator layers 1260, 1266 are joined to at least partially encapsulate the center barrier 1272. Also, the PCB 1230 is shown secured to a coil assembly 1231.

Referring to FIGS. 13A-13C, another embodiment of the sensor 1300 is depicted, wherein the sensor 1300 is a proximity sensor having an elongate cylindrical housing 1302 with external threads 1303 to which complementary mounting nuts (not shown) can be threaded. A sensing face 1305 is located at a first end 1301 of the housing 1302 to permit the associated circuitry (not shown) within the housing 1302 to perform a proximity sensing function through the sensing face 1305, as is known in the art. An annular indicator layer 1304 is provided to convey a status indication, such as to indicate "power on" or "object sensed." A connector port 1309 is located opposite the sensing face 1305 to provide a means for powering the sensor 1300.

In at least some embodiments, the indicator layer 1304 is positioned adjacent to the connector port 1309. The housing 1302, indicator layer 1304, and connector port 1309 are secured together, for example, by means of a press fit or adhesive. A PCB 1330 is situated inside the housing 1302 and includes a light source 1307 mounted thereon. Connector pins 1311 situated inside the connector port 1309 are connected to the PCB 1330 by wires 1313. When energized, light from the light source 1307 enters the indicator layer 1304 to produce enhanced light 1316 that is emitted from the circumferential end wall 1314 of the indicator layer 1304 to provide an "edge-glow" effect that can be viewed radial-symmetrically around the sensor 1300. A housing interior 1315 of the housing 1302 can be filled with a transparent or translucent potting compound 1336. Although this embodiment is shown with a single light source 1307 and a single indicator layer 1304, more than one indicator layer 1304 and light source 1307 can be provided utilizing at least some configurations of the various embodiments described above.

Referring to FIG. 14, still another embodiment of the sensor 1400 is depicted, wherein the sensor 1400 is a photoelectric sensor. The sensor 1400 includes a housing 1402 with sensing optics 1417 and associated circuitry (not shown) to perform a photoelectric sensing function through the optics 1417, as is known in the art. The housing 1402 has integral mounting holes 1419. The mounting holes 1419 can be internally threaded and can take the form of slots. Although depicted as being located adjacent the optics 1417, it should be noted that the mounting holes 1419 can be located in various locations about the sensor 1400 and can vary in quantity. First and second indicator layers 1460, 1466 can be provided. In at least some embodiments, the indicator layers 1460, 1466 are configured similar to as shown and described with reference to FIG. 9. Light losses from the indicator layers 1460, 1466 can be limited or prevented by a top surface barrier 1452. Further, back corners 1423 of the housing 1402 can be chamfered to allow for light from the end walls 1414 to be viewable from above as well as around the sensor 1400. A cable 1425 or other power connection can be provided to supply power to the sensor 1400.

Figure 15:
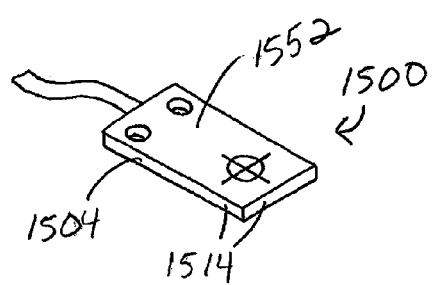
FIG. 15 is a perspective view of an exemplary sensor in a thin-profile embodiment.
Figure 16:
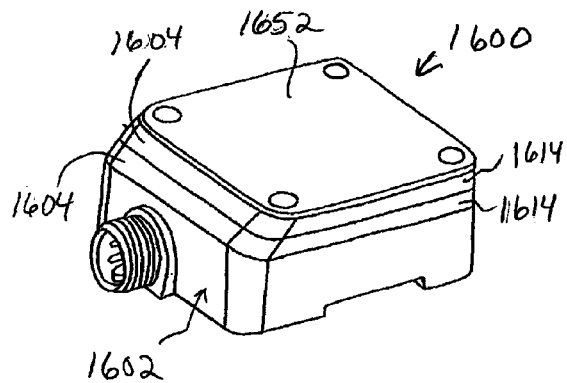
FIG. 16 is a perspective view of an exemplary sensor in a large-profile embodiment.
Figure 17A:
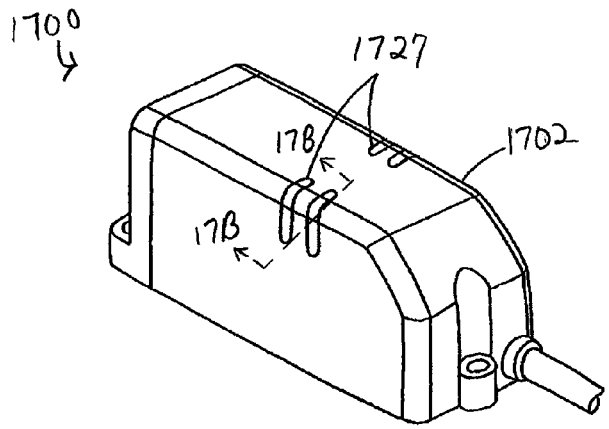
FIG. 17A is a perspective view of an exemplary sensor with limited-view indicator layers.
Figure 17B:
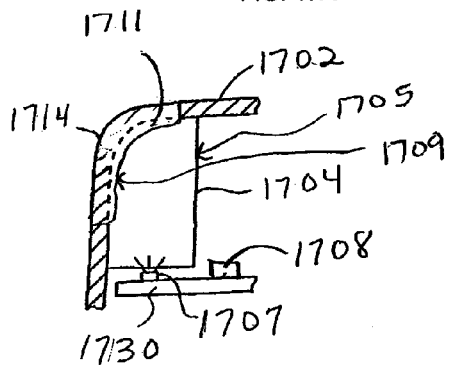
FIG. 17B is a partial cross-sectional view of FIG. 17A taken along line 17B-17B thereof.
Figure 17C:
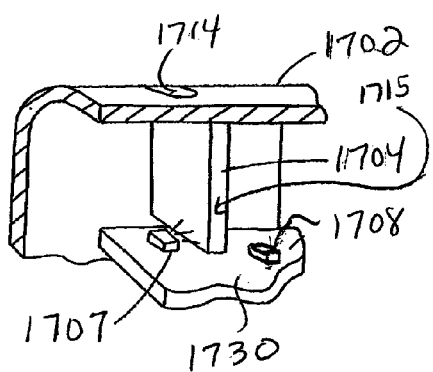
FIG. 17C is another partially cut-away, cross-sectional view of the sensor of FIG. 17A.

Referring to FIGS. 15 and 16, a thin-profile embodiment of the sensor 1500 and a large-profile embodiment of the sensor 1600, respectively, are shown. As illustrated, the size of the sensors can vary to accommodate a particular application. Further, referring to FIGS. 17A-17C, in at least some embodiments, end walls 1714 of indicator layers 1704 can be partially blocked by a housing 1702. This configuration can serve to increase the intensity of the enhanced light emitted from the exposed end walls 1714. In addition, the indicator layers 1704 can be used to convey light from a light source 1707 that is not or cannot be positioned close to the desired portion of the housing 1702 to provide sufficient illumination to be accurately detected by an observer.

Further, the indicator layer 1704 in at least some embodiments can include standard fluorophores, such as nanophosphors or quantum dots in high volumes positioned close to the exterior surface 1714 of the indicator layers 1704, by applying them onto the exterior surface 1714, such as by painting. In other embodiments, an inner groove 1709 can be situated inside the indicator layer 1704 and in close proximity to a layer perimeter 1715 of the indicator layer 1704. Groove side walls 1711 can be deposited with the nanophosphor or quantum dot material to illuminate the layer perimeter 1715 through the end walls 1714, without exposing the nanophosphor or quantum dot material to the external environment. Situating the nanophosphor or quantum dot material in high volumes close to the exterior surface 1714, as described, can be performed on other indicator layers discussed herein as well. This placement of the nanophosphor or quantum dot material allows for a conduction of light from the light source to the fluorescent volume where the emission of the desired color is generated with the added benefit of scattering light into higher angles to improve visual output of the indicator layer. For example, when a sensor incorporates the nanophosphor or quantum dot material in high volumes close to the exterior surface 1714 and the sensor is mounted at a height that exceeds the eye level of an end user, such that the end user has to look up at an angle to view the end wall 1714 of the sensor 1700, for example, an angle greater than about 45 degrees but less than about 90 degrees relative to horizontal, the added brightness produced by the higher volume close to the exterior surface provides improved visibility of the illumination of the indicator layer 1704. In addition to improved visibility, color differentiation between multiple indicator layers can be improved as well.

Figure 24:
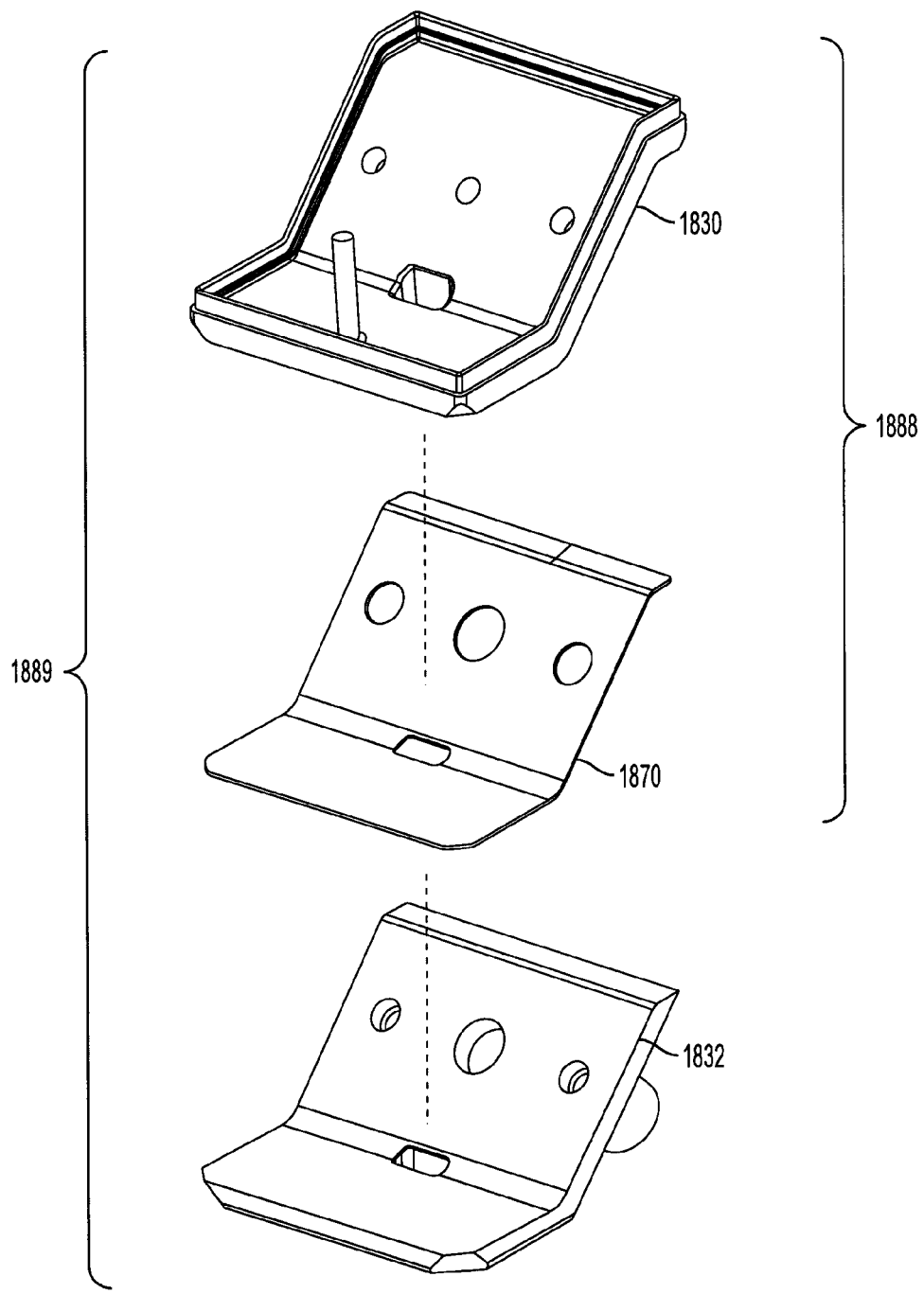
FIG. 24 is an exploded view of an indicator component in accordance with one or more embodiments.

FIGS. 18-21 illustrate a sensing device 1800, such as a proximity sensor, that includes one or more indicators, as constructed in one or more embodiments. The sensing device includes a housing 1810 with one or more indicator layers 1820, where the housing 1810 is configured to at least partially enclose the indicator layers 1820 and a light source 1808. In one or more embodiments, the sensing device 1800 includes an indicator component 1818 with two or more indicator layers 1820, such as a first indicator layer 1830 (FIG. 24), and a second indicator layer 1832 (FIG. 24). FIGS. 22 and 23 illustrate exploded views of examples of the sensing device 1800 according to one or more embodiments. The sensing device 1800 further includes one or more of a shield 1802, bobbin 1804, PCB 1806 including a sensing circuit, light source 1808, indicator component 1818, potting plug assembly 1819, mounting structure 1850, fasteners 1851, or connector assembly 1816.

The light source 1808 (FIG. 24) provides light to illuminate the indicator layers 1820 to provide an indication based on the sensing of an event by the sensing device 1800. The sensing device 1800 can include one of various types of sensing circuits for providing an output to energize the light source 1808 when desired conditions are met. Such sensing circuits are commonly found, for example, in proximity sensors and photo sensors.

Figure 25:
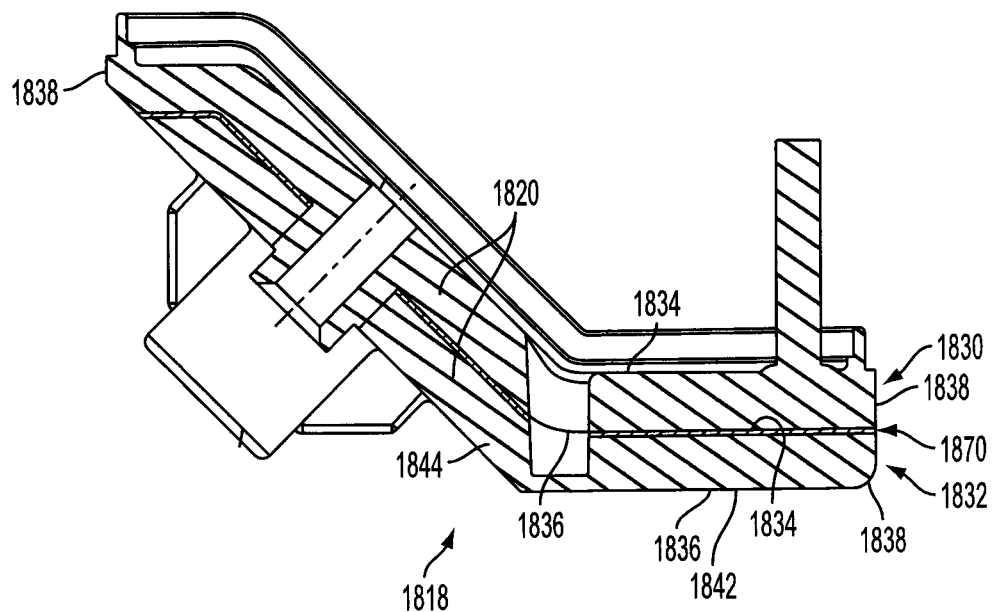
FIG. 25 is a cross-sectional view of an indicator component in accordance with one or more embodiments.

Referring to FIGS. 23-25, an indicator layer 1820 and the light source 1808 (FIG. 23) are shown. The light source 1808 serves to provide illumination to the indicator layers 1820 and can include one or more of various source of light, for example, an incandescent light bulb, an LED, and an OLED. The indicator layer 1820 has a top surface 1834, a bottom surface 1836, and one or more end walls 1838 forming a layer perimeter.

The indicator layer 1820 includes, in one or more embodiments, a substrate with embedded and/or enclosed fluorophores. The fluorophore may consist of a fluorescent dye, nano-phosphor, or quantum dot. The light source 1808 can be positioned to direct light through the top surface 1834 of the indicator layer 1820. Light received into the top surface 1834 of the indicator layer 1820 is reflected and affected by the fluorophore to establish enhanced light. In one or more embodiments, the fluorophore absorbs the light received from the light source 1808 and, upon absorption, the wavelength of the light is both shifted along the electromagnetic spectrum from a higher energy, shorter wavelength to a lower energy, longer wavelength and scattered in many directions to increase the visibility of the light to the human eye from various observation directions. In one or more embodiments, the overall size of the surfaces 1834, 1836 is greater than the height of the end wall 1838 such that the enhanced light produces an intensified image along the perimeter of the end wall 1838 as it is emitted from the indicator layer 1820.

As the top surface 1834 and/or bottom surface 1836 of the indicator layers 1820 can be at least partially enclosed by a housing, such as housing 1810, to maximize visibility the enhanced light is directed to the typically exposed end walls 1838 forming the layer perimeter. In one or more embodiments, depending on the surface configuration used for the indicator layer, the amount of enhanced light (after being established within the indicator layer) that passes through the top surface and the bottom surface, and therefore does not reach the end walls (i.e., light losses), can be minimized. For example, when the indicator layer is configured in a sheet or sheet-like form where the top and bottom surface are highly polished, such as to an SPI-A3 or better finish, so as to produce internal reflections, the enhanced light is predominantly reflected internally towards the end walls of the indicator layer. In addition, as the enhanced light is internally reflected within (e.g., internally reflected off the top and bottom surfaces) the indicator layer and communicated to the end walls, it becomes more concentrated and thereby produces a bright glowing effect along the end walls as the enhanced light is emitted from the indicator layer. This glowing effect is known as an "edge-glow" effect.

The end walls 1838 are shown orthogonal to the plane of the top surface and bottom surface, which are parallel to one another, to maximize illumination from the end walls, although the end walls can be positioned at various other angles relative to the top surface and/or bottom surface, which need not always be parallel to one another. To maximize the "edge-glow" effect, the indicator layer can be comprised of a transparent material to maximize internal reflections. In at least some embodiments, the indicator layer can include a transparent, semi-transparent, and/or translucent material, such as acrylic (PMMA), polycarbonate (PC), styrene-acrylonitrile (SAN), or polystyrene (PS), although other materials with varying transparency levels can be used as well, such as glass. In other embodiments where nano-phosphors or quantum dots are used, the indicator layer can include these compounds in its bulk, embodied in an attached or applied layer at least partially covering the outer surface around the indicator layer. The nano-phosphors and quantum dots are fluorophores that absorb energy emitted by the light source and re-emit that energy at random angles and at specified wavelengths defined by the fluorophore's size. One benefit of using nano-phosphors or quantum dots is their inherent efficacy in wavelength conversion between the emission of the light source and the desired output color. Another benefit is that a sensor can be standardized in form and function and then specialized by the addition of the nano-phosphor or quantum dot layers and surfaces. Yet another benefit is that the nano-phosphor or quantum dots can be spatially constructed to impart information about a sensor such as a logo, part number, and operational-state data, without having to add these features into the molded part. In this regard, the indicator layer and/or a display layer can be utilized in one or more embodiments to display the sensor information, wherein the display layer would be visible through a sensor housing, such as housing, and sized to accommodate the information as necessary and/or desired.

Further, to increase the uniformity of illumination along the end walls, a diffuse light source can be employed as the light source. Also, applying a texture, such as a Charmilles #30 or Mold-Tech® MT-11520, to the end walls can assist with producing a generally uniform and diffuse "edge-glow" effect. The fluorophore can be of any conventional, commercially-available fluorescent dye, nano-phosphor, or quantum dot that is suitable for absorbing and enhancing light and capable of being embedded in the indicator layer.

Referring to FIG. 25, a view of the indicator component 1818 is shown in cross-section. The indicator component 1818 includes at least two indicator layers 1820, namely, a first indicator layer 1830 having a top surface 1834 and a bottom surface 1836, and a second indicator layer 1832 having a top surface 1834 and a bottom surface 1836. The top surface 1834 of the first indicator layer 1830 is secured to the housing 1810. In one or more embodiments, a center barrier 1870 is provided between the first indicator layer 1830 and the second indicator layer 1832. The center barrier 1870 is provided to limit or prevent enhanced light that is passed through the first indicator layer 1830 from entering the second indicator layer 1832. Similarly, the center barrier 1870 limits or prevents second enhanced light that is passed through the second indicator layer 1832 from entering the first indicator layer 1830. The center barrier 1870 allows for the illumination of indicator layers 1830, 1832 to be independent of each other.

In one or more embodiments, the center barrier 1870 can include a substrate comprised of an opaque metallized plastic, a metallic foil, reflective in-mold-label, or other suitable material that serves to limit or prevent the transmission of light therethrough. In addition to or in place of a substrate, the center barrier 1870 can be comprised of a reflective coating that is applied to one or both of the bottom surface 1836 and the top surface 1834. In one or more embodiments, the center barrier includes an in-mold label. In at least one embodiment, the in-mold label is made of transparent acrylic and consists of a white ink layer printed over an opaque silver ink layer printed over a white ink layer (white-silver-white) on one side of the acrylic label. The white ink layer produces a lambertian scattering of the light that serves to increase the intensity of the light conveyed by the status indicators while the opaque silver layer prevents light from bleeding through the label to the other side. In one or more embodiments, the center barrier has cut outs which correspond to components inserted therethrough, or with openings in the indicator component 1818. In one or more embodiments, the center barrier is approximately 0.010″ shorter along the edges than the finished part in order to prevent the edges of the label from being exposed to the outside environment.

Figure 18:
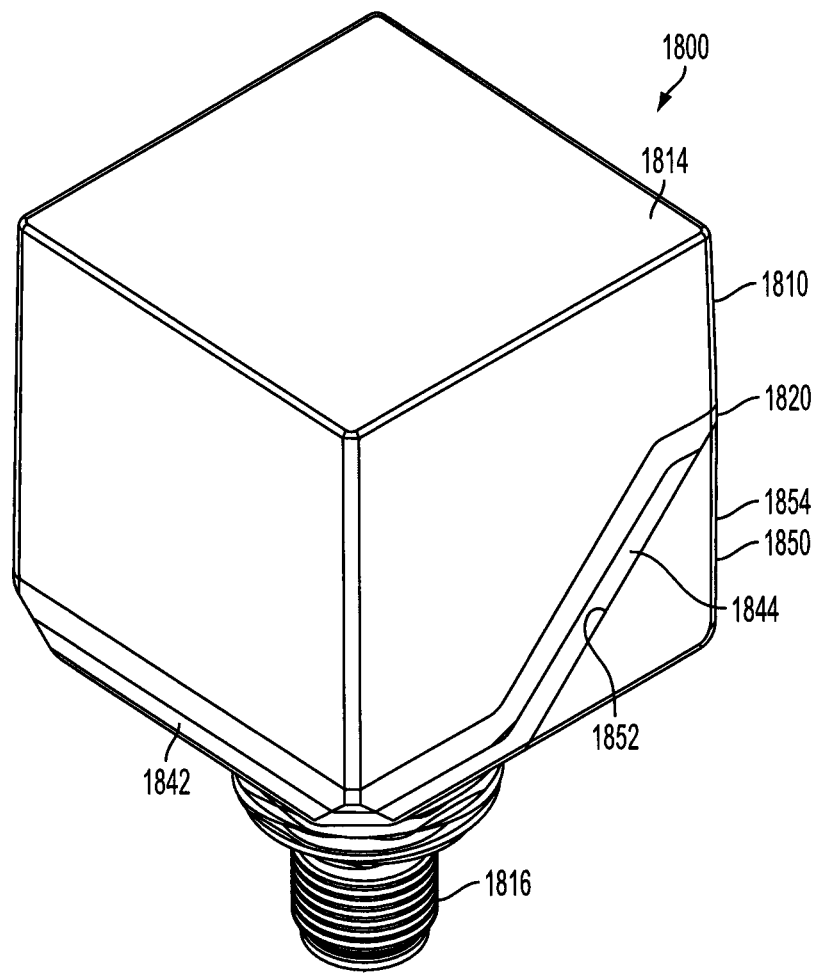
FIG. 18 is an isometric view of a sensor device in accordance with one or more embodiments.

In one or more embodiments, the indicators layers 1820 have a non-planar overall shape, for example as shown in FIGS. 22 and 25. In one or more embodiments, the indicator layer 1820 has a first portion 1842 that is aligned with a first edge of the housing, for example as shown in FIG. 18, 25. In one or more embodiments, the indicator layer 1820 has a second portion 1844 that is angled relative to the first portion 1842, for instance at an angle of 45 degrees relative to the edge of the housing, as shown in FIG. 22. The angled indicators layers 1820 assist with the visibility of the indicators of the sensing device such that they can be easily viewed 360 degrees around the sensing device regardless as to what orientation the sensing device is mounted in. Other angles that allow sufficient viewing of the indicator layer around the sensing device are contemplated herein as well.

In one or more embodiments, the at least one indicator layer 1820 extends along an edge of at least one of a top, bottom, side surface of the housing and transitions away from the edge and toward an intermediate portion of the outer housing. In one or more embodiments, the end wall portion of the indicator layer substantially circumnavigates a housing perimeter. In one or more embodiments, the indicator layer 1820 circumnavigates the housing such that the indicator layer is visible 360 degrees around the housing, optionally the end wall of the indicator layer completely circumnavigates the housing. In one or more embodiments, the housing has two or more side planes, and the end wall is disposed along a portion of each of the side planes.

In one or more embodiments, a cross-section of one or more of the indicator layers has an overall non-linear shape. The indicator layers 1820, in one or more embodiments, have an overall structure that is non-planar, and portions of the indicator layer 1820 can be planar, for example, as shown in FIG. 25.

Figure 19:
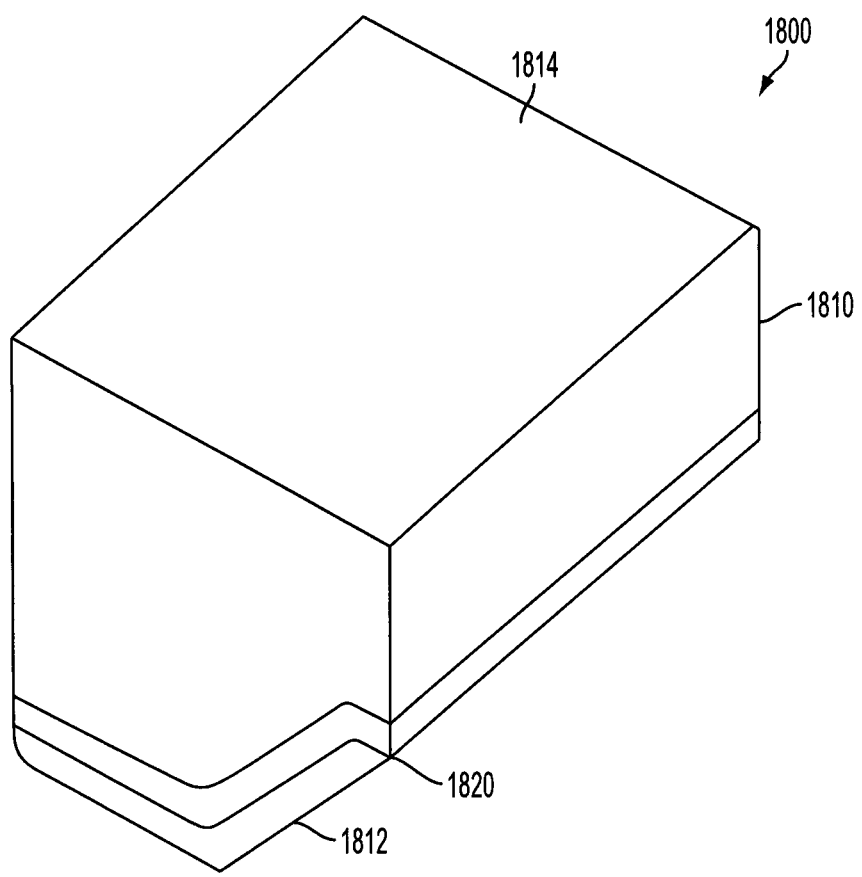
FIG. 19 is an isometric view of a sensor device in accordance with one or more embodiments.
Figure 20:
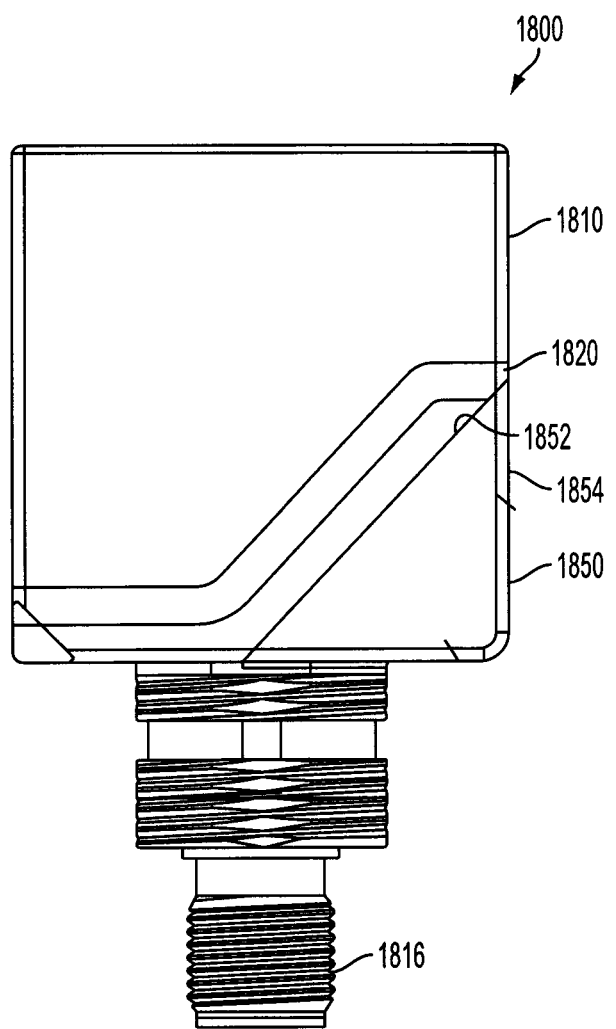
FIG. 20 is a side view of a sensor device in accordance with one or more embodiments.
Figure 21:
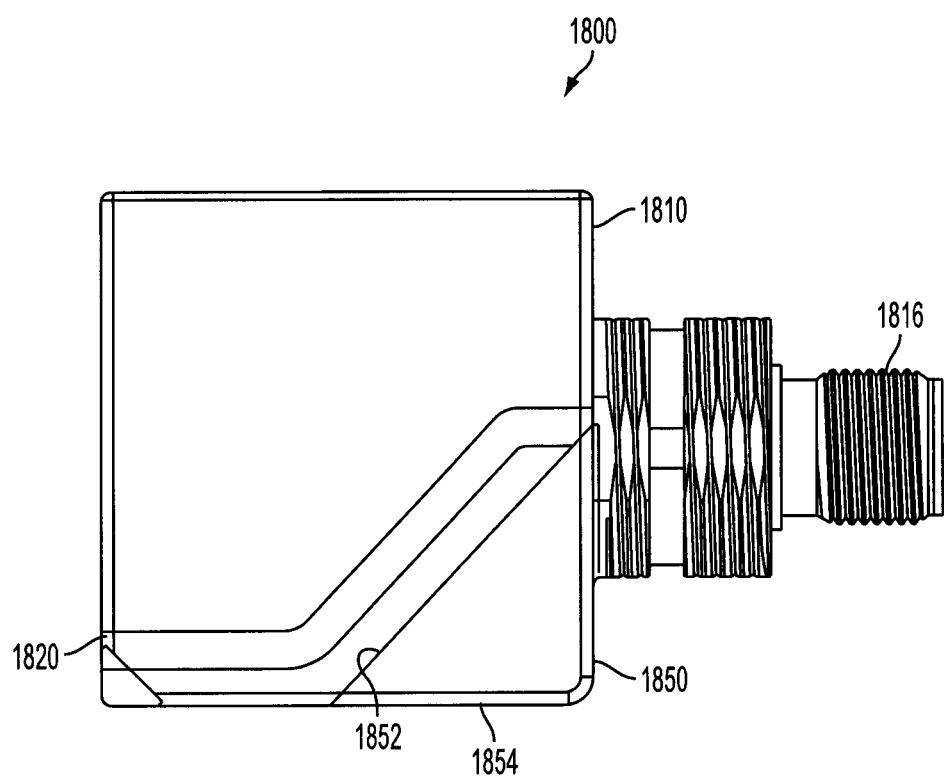
FIG. 21 is a side view of a sensor device in accordance with one or more embodiments.
Figures 22, 23:
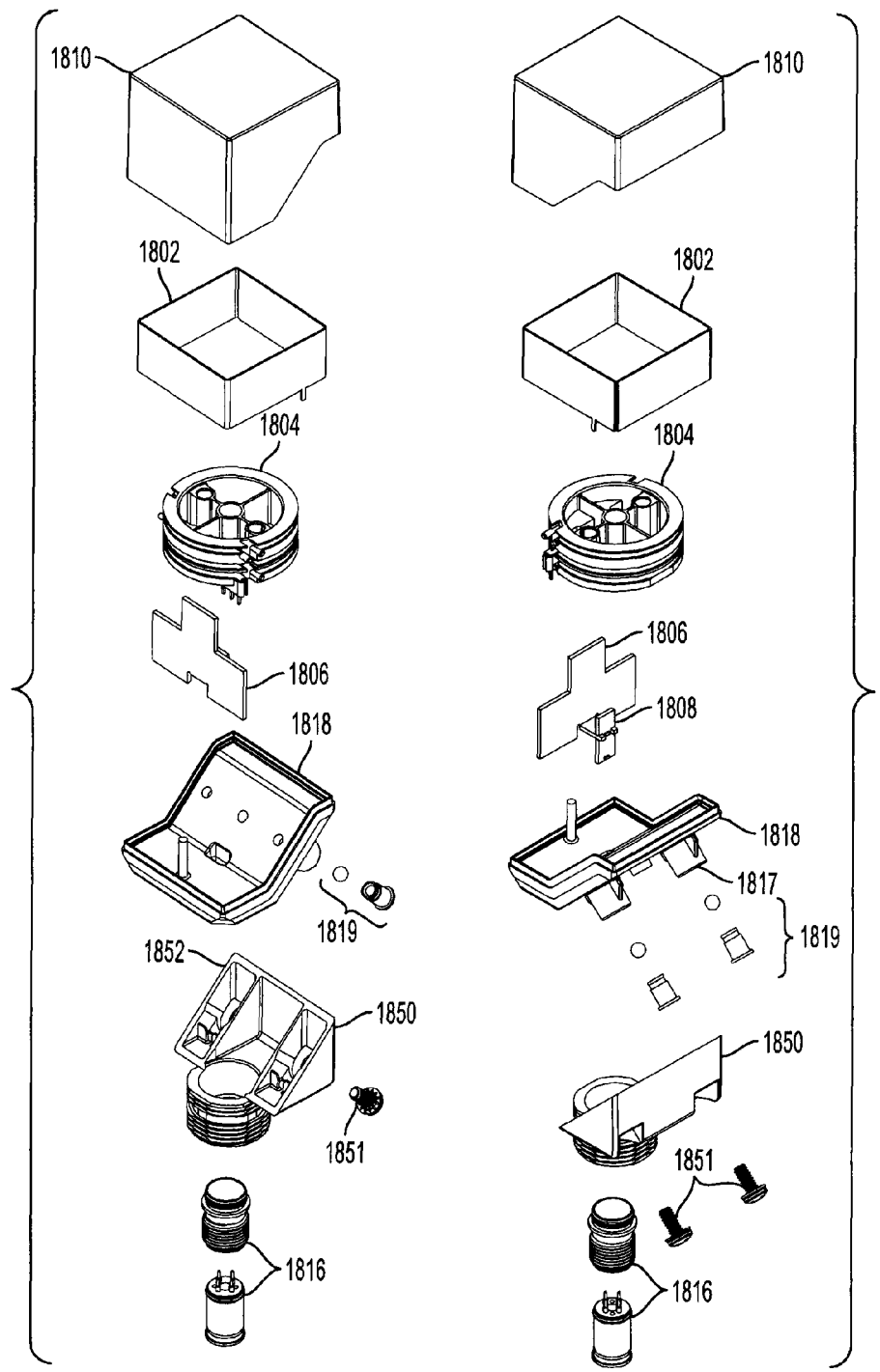
FIG. 22 is an exploded view of a sensor device in accordance with one or more embodiments.
FIG. 23 is an exploded view of a sensor device in accordance with one or more embodiments.

The sensing device 1800 further includes mounting structure 1850 which is detachably coupled with the sensing device 1800, where FIGS. 18, 20-21 show the sensing device 1800 with the mounting structure 1850, and FIG. 19 illustrates the sensing device 1800 without the mounting structure 1850. The mounting structure 1850 includes an angled portion 1852, for example a 45 degree angle relative to an outer wall 1854 of the mounting structure 1850. The angle portion 1852 is disposed adjacent to an angled portion 1812 of the sensing device 1800, as shown in FIG. 19. In one or more embodiments, the angled portion 1812 of the sensing device 1800 is disposed at a 45 degree angle relative to a top sensing surface or plane 1814.

The angled surfaces allow for the mounting structure 1850 in multiple orientations relative to the sensing device, allowing for the sensing device to be mounted in multiple orientations. For example, FIGS. 18 and 20 illustrates the mounting structure 1850 mounted to the sensing device 1800 in a first orientation. The mounted structure can be rotated 90 degrees as shown in FIG. 21. The indicator layers 1820 are visible in 360 degrees of the device 1800 regardless of the orientation of the sensing device. However, depending on the desirability of the location of the various indicator layers, various rotations and types of mounting structure 1850 can be used.

To assemble to the sensing device, referring to FIG. 24, the indicator layer 1830 is overmolded with a barrier 1870 in a first stage of assembly 1888. This assembly is overmolded with the second indicator layer 1832 at a second stage of assembly 1889, to create an indicator component 1818. The housing 1810, shield 1802, bobbin 1804, PCB 1806 and light source 1808 are assembled (see FIGS. 22, 23). Potting material is disposed through the filling ports or potting ports 1817. A sealing member, such as a sphere, for example, an acrylic ball, is disposed within the port, and an insert is disposed in the port. The insert is shaped and/or sized to trap the sealing member or sphere within the port. In one or more embodiments, the insert is sized such that the sphere seals against the insert, and the insert is interference fitted within the port. The sealing member is sized and/or shaped to prevent exit of potting material from the sensing device. A connector assembly 1816 is further assembled to the sensing device.

Although the above description discloses in at least some embodiments sensors for use in industrial controls, such as proximity and photoelectric sensors, it should be understood that other non-industrial and industrial sensing and indicating products can also be included, for example, illuminating cord-sets, light curtains, safety products, PLC's, motor drives, Through-Beam sensors, Transceiver sensors, Color Contrast sensors, Time-Of-Flight sensors, and stack lights.

Various types of sensors can include the indictor layers as discussed herein, and can further include multiple center barriers, light sources, and indicator layers, as desired to provide varying levels of indication. Further, in at least some embodiments, the material used for the indicator layers can be different, even when the indicator layers are hermetically joined together. Sensing circuits can be mounted on the PCB or on another circuit board in the housing. Alternatively, the sensing circuit can be located separate from the housing. The sensing circuit can vary among the embodiments and is selected based on the particular type of sensor used and its intended use.

Notwithstanding the above examples, the present invention is intended to encompass numerous other embodiments and/or applications, and/or to satisfy a variety of other performance levels or criteria in addition to or instead of the above examples. It is specifically intended that the present invention not be limited to the embodiments and illustrations contained herein, but include modified forms of those embodiments including portions of the embodiments and combinations of elements of different embodiments as come within the scope of the following claims.

We claim:

1. A sensing device comprising:
at least one indicator component including at least one indicator layer, the at least one indicator layer having a thin, sheet-like form having a length and width significantly greater than its height, the at least one indicator layer including a first indicator layer having a top surface, a bottom surface, and one or more end walls at least partially between the perimeters of the top surface and the bottom surface, one or more of the top surface and the bottom surface of the first indicator layer having a polished surface to produce internal reflections within the first indicator layer;
the first indicator layer having fluorophores embedded therein;
a first light source disposed near the indicator layer, wherein light transmitted from the first light source is reflected inside the first indicator layer and is absorbed by the fluorophores to be emitted as an enhanced light with its wavelength shifted from a shorter wavelength to a longer wavelength and scattered in many directions to increase its visibility;
a housing at least partially enclosing the at least one indicator component, the first light source and a sensing circuit;
the one or more indicator layer end walls substantially circumnavigates the housing such that the indicator layer is visible 360 degrees around the housing, the one or more end walls exposed along an outer surface of the housing; and
wherein the enhanced light is predominantly reflected internally towards the one or more end walls and internally reflected off the top and bottom surfaces and then is emitted out from the one or more end walls, wherein the enhanced light includes the light transmitted from the first light source with at least one characteristic modified by the fluorophores, the first indicator layer having an edge glow effect.

2. The sensing device as recited in claim 1, wherein the one or more end walls of the indicator layer completely circumnavigates the housing.

3. The sensing device as recited in claim 2, wherein the housing has two or more side planes, and the one or more end walls is disposed along a portion of each of the side planes.

4. The sensing device as recited in claim 1, wherein the at least one indicator component includes a plug assembly, the plug assembly having a filling port, and a sphere is disposed within the filling port.

5. The sensing device as recited in claim 4, wherein the plug assembly further includes an insert disposed within the filling port, and the sphere seals against the insert within the filling port.

6. The sensing device as recited in claim 1, wherein the indicator layer extends along an edge of at least one of a top, bottom, side surface of the housing and transitions away from the edge and toward an intermediate portion of the outer housing.

7. The sensing device as recited in claim 1, wherein the one or more end walls extends substantially around a perimeter of the housing to provide a visual indication when the first light source is illuminated, wherein the visual indication is viewable from around the perimeter of a side of the housing.

8. A sensing device comprising:
a housing having an outer perimeter;
at least one indicator component including a first indicator layer and a second indicator layer, the first indicator layer and the second indicator layer including fluorophores embedded therein, the at least one indicator layer having a thin, sheet-like form having a length and width significantly greater than its height;
the first indicator layer including a substrate having a first top surface, a first bottom surface, and first end wall is at least partially between perimeters of the first top surface and the first bottom surface, the first indicator layer at least partially disposed within the housing, the first end wall substantially disposed around the outer perimeter of the housing, one or more of the first top surface and the first bottom surface of the first indicator layer having a polished surface to produce internal reflections within the first indicator layer;
the second indicator layer including a substrate having a second top surface, a second bottom surface, and second end walls is at least partially between the perimeters of the second top surface and the second bottom surface, one or more of the second top surface and the second bottom surface of the second indicator layer having a polished surface to produce internal reflections within the second indicator layer;
a center barrier positioned between the first indicator layer and the second indicator layer, wherein the center barrier at least partially limits the passage of light between the first and second indicator layers;
a light source disposed near the first indicator layer and the second indicator layer, wherein light transmitted from the first light source is reflected inside the first indicator layer and is absorbed by the fluorophores to be emitted as an enhanced light with its wavelength shifted from a shorter wavelength to a longer wavelength and scattered in many directions to increase it visibility, the first and second indicator layers having an edge glow effect, the enhanced light is predominantly reflected internally towards the first and second end walls and internally reflected off the top and bottom surfaces and then is emitted out from the first and second end walls of the first and second indicator layers to create the edge glow effect;
the housing at least partially enclosing the at least one indicator component, the light source, and a sensing circuit;
the first and second end walls substantially circumnavigate the housing such that the indicator layer is visible 360 degrees around the housing, the first and second end walls exposed along an outer surface of the housing; and
the at least one indicator component includes a plug assembly, the plug assembly having a filling port, and a sphere is disposed within the filling port.

9. The sensing device as recited in claim 8, wherein a cross-section of the first indicator has an overall non-linear shape.

10. The sensing device as recited in claim 8, wherein at least one of the end walls of the first and second indicator layers departs from an edge of housing to an intermediate outer portion of the housing.

11. The sensing device as recited in claim 8, further comprising a mounting structure coupled with the housing, wherein the mounting structure is mountable relative to the indicator layer in multiple orientations.

12. The sensing device as recited in claim 8, further comprising a mounting structure coupled with the housing, wherein the mounting structure is mountable relative to the indicator component in multiple orientations.

13. A method of providing indication for a sensing device, the method comprising:

sensing an operational status at a sensor circuit;

generating a signal at the sensor circuit based on the sensed operational status;

utilizing the signal to activate a light source;

transmitting light into an indicator component including a first indicator layer with the light source and creating an edge glow effect, wherein the first indicator layer includes fluorophores embedded therein, the first indicator layer having a thin, sheet-like form having a length and width significantly greater than its height, the first indicator layer having a top surface, a bottom surface, and end walls at least partially between the perimeters of the top surface and the bottom surface, one or more of the top surface and the bottom surface of the first indicator layer having a polished surface to produce internal reflections within the first indicator layer;

reflecting light from the light source inside the first indicator layer, wherein light transmitted from the light source and reflected inside the first indicator layer is absorbed by the fluorophores to generate enhanced light;

predominantly reflecting the enhanced light internally and towards the end walls, including internally reflecting the enhanced light off of top and bottom surfaces of the first indicator layer; and emitting the enhanced light from the end walls of the first indicator layer, the end wall disposed along a perimeter of the sensing device, and is viewable around a perimeter of the sensing device, wherein the enhanced light includes the light transmitted from the first light source with at least one characteristic modified by the fluorophores.

14. The method as recited in claim 13, further comprising transmitting light into a second indicator layer.

15. The method as recited in claim 14, further comprising preventing optical cross-talk between the first indicator layer and the second indicator layer.

16. The method as recited in claim 15, wherein preventing optical cross-talk includes preventing optical cross-talk with a center barrier disposed between the first indicator layer and the second indicator layer.

17. The method as recited in claim 13, further comprising mounting a mounting structure on the sensing device relative to the indicator component in one of multiple orientations.

18. The method as recited in claim 13, wherein emitting light from the first indicator layer includes emitting light from the first indicator layer with an overall non-planar shape and the end wall extends around an entire perimeter of the sensing device.

* * * * *